United States Patent [19]

Gibbons

[11] 4,099,542
[45] Jul. 11, 1978

[54] MARINE LOADING ARM JUMPER ASSEMBLY

[75] Inventor: Harold M. Gibbons, Long Beach, Calif.

[73] Assignee: FMC Corporation, San Jose, Calif.

[21] Appl. No.: 694,256

[22] Filed: Jun. 9, 1976

[51] Int. Cl.² .............................................. B67D 5/00
[52] U.S. Cl. ..................................... 137/615; 141/387
[58] Field of Search ................ 137/615; 141/100, 285, 141/387, 388; 285/134, 168, 181

[56] References Cited

U.S. PATENT DOCUMENTS

| | | | |
|---|---|---|---|
| 1,925,091 | 9/1933 | Crossen, Jr. | 285/134 |
| 2,922,446 | 1/1960 | Sheiry | 141/388 |
| 3,176,730 | 4/1965 | Knight | 141/387 X |
| 3,199,898 | 8/1965 | Faccou | 137/615 X |
| 3,372,715 | 3/1968 | Ashton | 137/615 X |
| 3,409,046 | 11/1968 | Means | 137/615 |
| 3,586,352 | 6/1971 | Smulders | 285/134 |
| 3,620,268 | 11/1971 | Paddington | 285/168 X |
| 3,675,680 | 7/1972 | Frohlich et al. | 137/615 |
| 3,825,045 | 7/1974 | Bloomquist | 137/615 X |

*Primary Examiner*—Irwin C. Cohen
*Attorney, Agent, or Firm*—W. W. Ritt, Jr.; C. E. Tripp

[57] ABSTRACT

A marine loading arm jumper assembly especially suitable for use on a buoy or other offshore fluid transferring facility where tanker movements are large and space is limited. The assembly comprises a pair of articulated loading arms extending from a coaxial pipe swivel joint mounted on the buoy, and a terminal pipe swivel joint assembly including another coaxial swivel joint for connecting this dual arm system to a tanker manifold. A guide arm assembly also is provided to maintain the loading arm in proper alignment with the terminal swivel joint assembly while the arm is disconnected therefrom as during periods of very bad weather.

5 Claims, 5 Drawing Figures

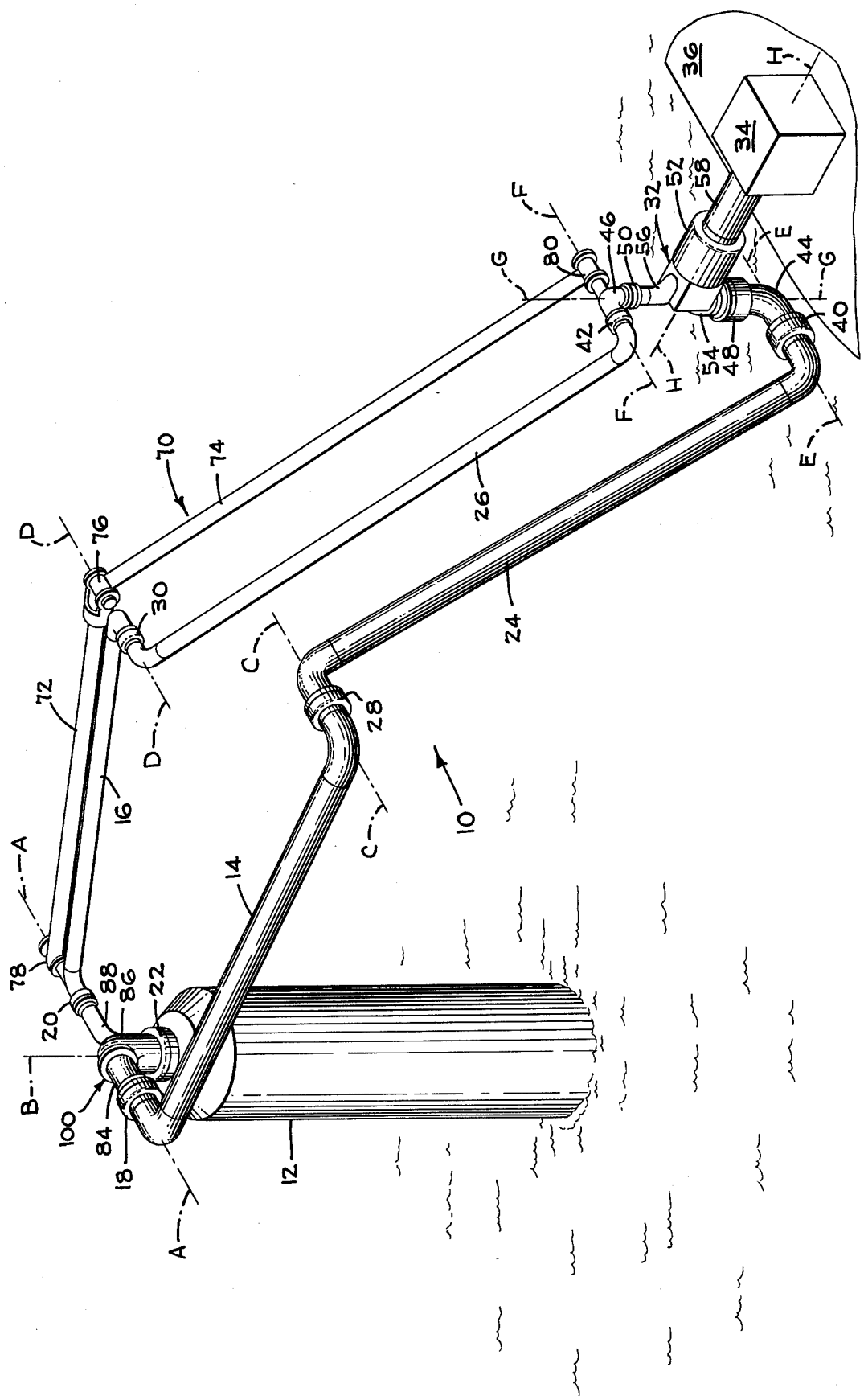

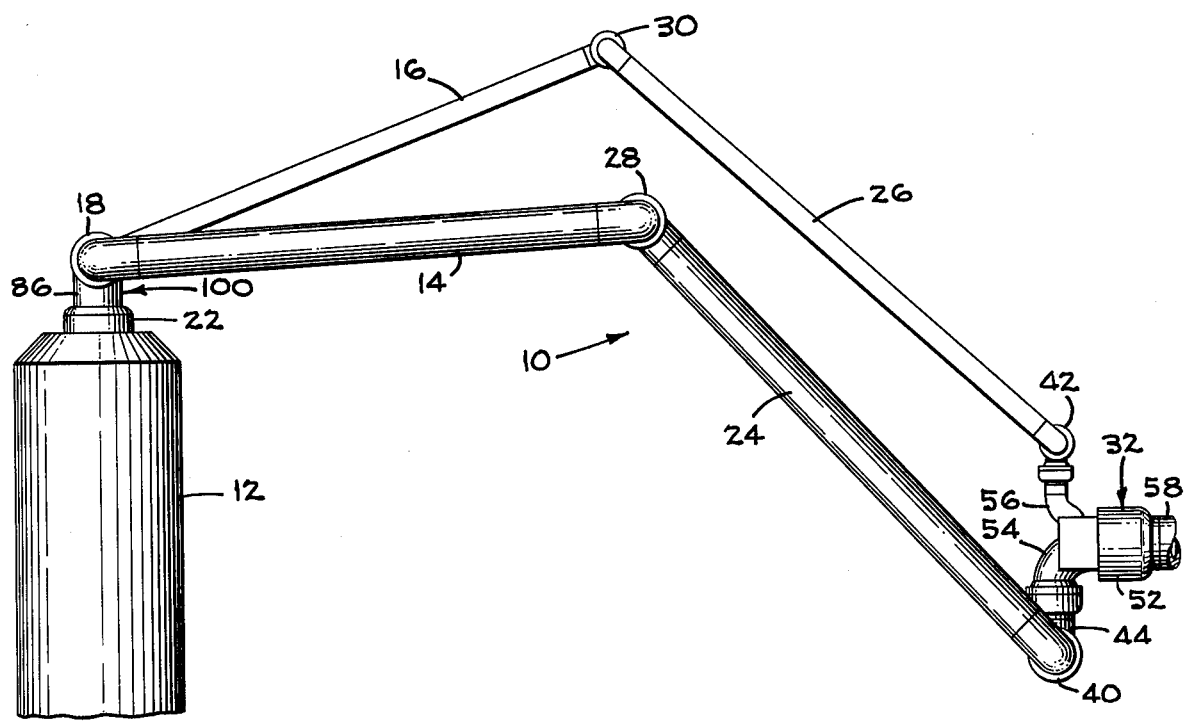
FIG_2
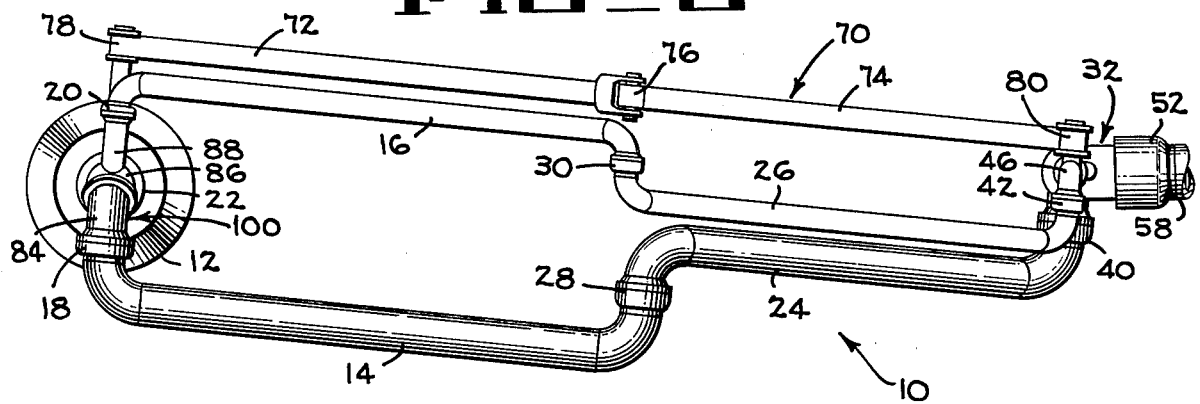
FIG_3

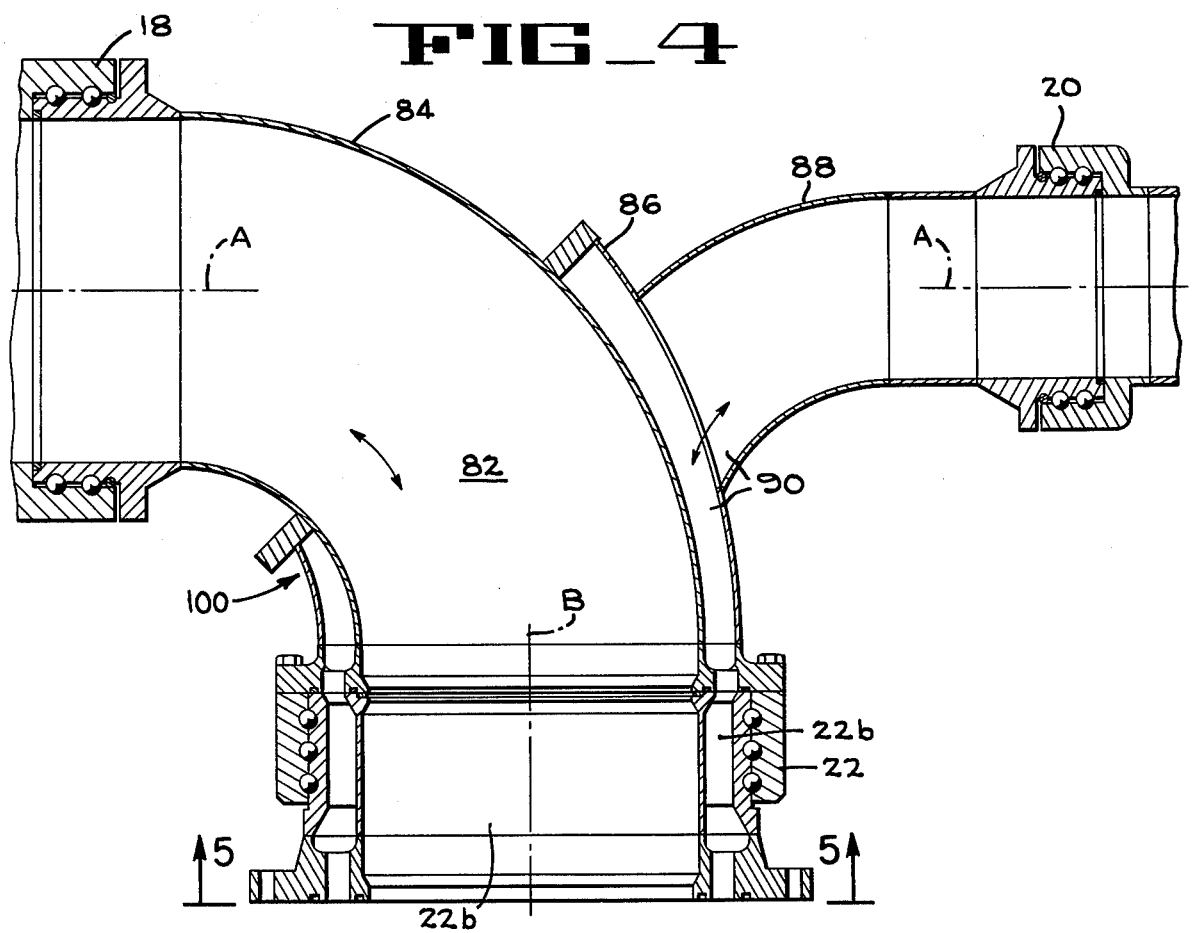
FIG_4
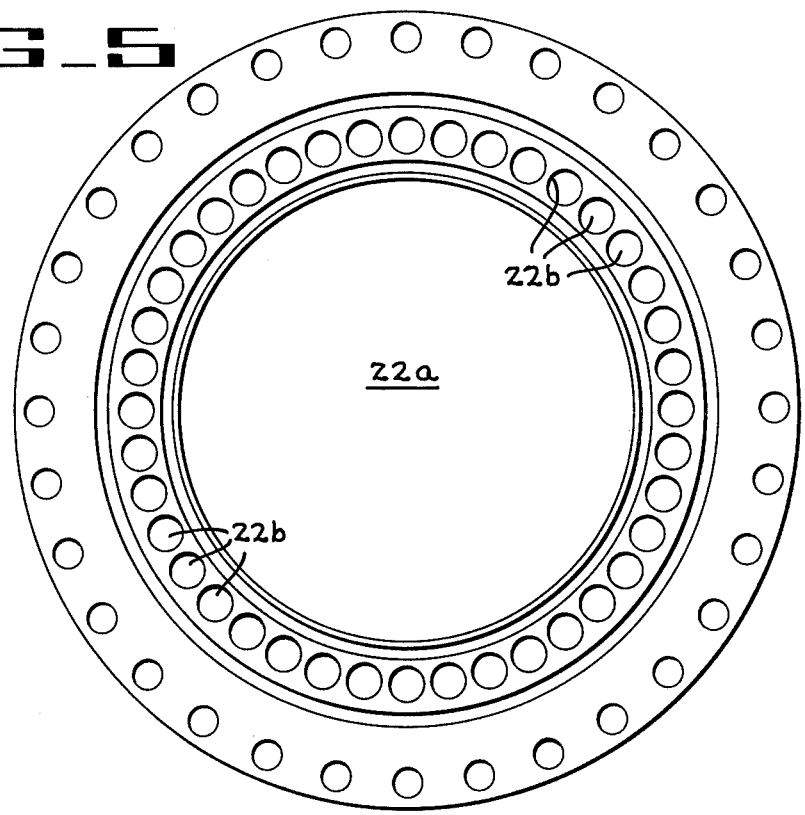
FIG_5

MARINE LOADING ARM JUMPER ASSEMBLY

BACKGROUND OF THE INVENTION

This invention relates to fluid transferring apparatus, and more particularly to marine loading arms especially for use on offshore located facilities. The invention especially relates to single-point mooring systems with equipment for transferring fluid cargo between the mooring station and the transport or reservoir vessel.

Ordinarily when using marine loading arms to transfer more than one type of fluid product between a tanker or other marine vessel and a reservoir facility, a separate arm is employed for each product. In cases where the movements of the tanker are small, this method has usually been satisfactory. However, where bad weather, high tides or other climatic or environmental conditions cause very large tanker movements, and where space at the tanker manifold or on the offshore loading facility is limited, it often is difficult to avoid interference between the several arms while they are in service.

Another disadvantage with conventional loading arms is that maneuvering them to couple them to a tanker manifold can be a difficult and time-consuming task, especially where there is considerable relative movement between the tanker and the buoy or tower on which the arms are mounted. This disadvantage becomes acute when bad weather requires that the arm be uncoupled from the manifold before fluid transfer is completed, for when the weather improves the arm again must be coupled to the tanker to finish the fluid transferring operation. Recoupling usually takes as much time as the original coupling step, and is fraught with the same difficulties. This problem can occur more often at offshore loading stations where a marine tanker is permanently moored to serve as a temporary storage reservoir, and loading arms are employed to convey the fluid from the mooring buoy or tower to the storage tanker.

SUMMARY OF THE INVENTION

The present invention comprises a novel marine loading arm jumper assembly that facilitates simultaneous transfer of a plurality of products between an offshore buoy or tower and a marine tanker or other vessel, without interference between the plural arms of the assembly, and also without the spatial problems so often encountered when other fluid loading devices are employed. This jumper assembly, in a preferred embodiment comprises a pair of articulated loading arms extending from a coaxial riser pipe swivel joint mounted on the buoy or offshore tower, and terminating in a common terminal swivel assembly that includes another coaxial pipe swivel joint that maintains the arms in a predetermined spatial relationship throughout their use. The arms can be maneuvered in unison both horizontally and vertically to accommodate without interference, all movement of a floating vessel to which they may be coupled. The coaxial swivels facilitate handling different fluid products simultaneously, thus reducing the overall time required to complete the fluid transfer operation.

Where the loading arm assembly is to be employed between an offshore buoy or tower and a permanently moored marine reservoir tanker, the invention provides for the inclusion of a guide arm assembly between the coaxial swivel joint at the buoy or tower and the coupling assembly at the outer or terminal end of the arm, to maintain the fluid conducting arms and the coupling assembly in alignment when the arm is disconnected from the tanker as during bad weather, thereby facilitating reconnection of the arm to the tanker with a minimum of difficulty.

Accordingly, one object of the present invention is to provide a new type of articulated marine loading arm assembly for simultaneously transferring a plurality of fluid products between two points.

Another object of the present invention is to provide a dual marine loading arm jumper assembly especially suitable for use on offshore buoys or towers to transfer fluid to a floating marine reservoir vessel.

Another object of the present invention is to provide an improved articulated marine loading arm assembly for use in transferring liquefied natural gas or other volatile petroleum products between an offshore loading facility and a floating marine vessel, and simultaneously returning the vapors from the vessel to the loading facility.

Still another object of the present invention is to provide a new dual marine loading arm assembly that eliminates the problems of interference and spatial limitations inherent in the use of former loading arm equipment.

Yet another object of the present invention is to provide a new marine loading arm jumper assembly having a guide arm assembly to retain a predetermined alignment of the inner and outer portions of the loading arm when it is disconnected from its terminal tanker coupling structure.

Additional objects and advantages of the present invention will become apparent from the following description thereof, taken in conjunction with the accompanying drawings.

BRIEF DESCRIPTION OF THE DRAWINGS

FIG. 1 is an isometric of a marine loading arm jumper assembly mounted offshore on a buoy, and connected to a tanker manifold.

FIG. 2 is a side elevation of the loading arm jumper assembly of FIG. 1.

FIG. 3 is a plan view of the assembly of FIG. 2.

FIG. 4 is an enlarged vertical section through the riser and trunnion swivel assembly of the loading arm assembly illustrated in FIGS. 1–3.

FIG. 5 is a view taken along the line 5—5 of FIG. 4.

DESCRIPTION OF THE PREFERRED EMBODIMENT

Referring first to FIGS. 1–3, a dual marine loading arm jumper assembly 10 according to the present invention, shown mounted on an offshore buoy or tower illustrated diagrammaticlly at 12, comprises a pair of inboard arm sections 14,16 connected by means of trunnion pipe swivel joints 18,20, respectively, to a coaxial riser pipe swivel joint 22, a pair of outboard arm sections 24,26 connected to the inboard arm sections 14, 16 by pipe swivel joints 28,30 respectively, and an outer or terminal pipe swivel joint assembly 32 through which the dual arm 10 is connected to a manifold 34 (FIG. 1) of a marine tanker or other vessel 36.

As perhaps shown best in FIG. 4, the trunnion swivel joints 18,20 are oriented on a common horizontal axis A and thus provide a system for vertical pivotal movement of the loading arm 10 at the buoy 12, and the coaxial riser swivel joint 22 is oriented on a vertical axis B to facilitate horizontal pivotal movement of the arm with respect to the buoy 12. A suitable arrangement of riser pipes (not shown) extends up the inside of the buoy 12 to interconnect the coaxial riser swivel 22, and thus the loading arm 10, with fluid flow lines extending from the buoy to a remote location. Accordingly, the arm 10 is pivotable with respect to the buoy 12 in both vertical and horizontal planes, and in fact can be pivoted a full 360 degrees about the vertical axis B.

The pipe swivel joints 28,30 that interconnect the inboard and outboard arm sections are disposed on parallel horizontal axes C,D (FIG. 1) respectively, these axes also being parallel to the horizontal axis A through the joints 18,20 at the buoy 12. Thus, the outboard arm sections 24, 26 are pivotable with respect to the inboard sections 14,16, in a vertical direction, and can be so pivoted regardless of whether the inboard arm sections ae held stationary or are free to pivot the axis A.

The terminal swivel assembly 32 comprises a pair of first pipe swivel joints 40,42 oriented on horizontal axes E,F, respectively, these axes also being parallel to above described horizontal axes A,C, and D. A pair of pipe elbows 44,46 interconnect the first swivel joints 40,42 with a pair of second pipe swivel joints 48,50, respectively, and these joints 48,50 are oriented about a common vertical axis G which, of course, is perpendicular to the axis A through the coaxial riser swivel 22. A coaxial coupling pipe swivel 52, oriented on a horizontal axis H that is perpendicular to axis G, is connected to the vertical swivel joints 48,50 by pipe elbows 54,56, and a pipe system 58 or other suitable means, such as a quick connect-disconnect pipe coupler (not shown), is employed to couple the terminal swivel assembly 32, and thus the arm 10, to the manifold 34.

Because of the above described novel combination of swivel joints, the dual loading arm 10 will freely follow every movement of the tanker 36, even during periods when the water is relatively rough, without any restriction, other than of course the maximum vertical reach of the arm which is tailored to the mooring system employed at the particular location. Furthermore, with this arrangement there is no tendency for spatial interference to develop between the arm components, for the proximity of the several components to one another is always preestablished and therefore known, no matter what environmental conditions are encountered.

If the dual loading arm 10 is to be coupled to a permanently moored reservoir tanker, it may be desirable between loadings of that tanker to disconnect the arm from the tanker in order to minimize the danger of an oil spill should dangerously rough weather be forecast. In such a case, a guide arm assembly 70, comprising inner and outer arm sections 72,74, respectively, may be included to permanently connect the tanker 36 to the buoy or tower 12. The arm sections 72,74 are pivotally interconnected at 76 so that they can articulate in a vertical plane about the axis D that extends through the pipe swivel joint 30. The inner arm sections 72 is connected by a pivot joint 78 to the inner end of the loading arm's inboard pipe section 16, and this pivot joint 78 is oriented on the arm's horizontal axis A. The outer arm section 74 of the guide arm assembly 70 is connected by a pivot joint 80 to the terminal coupling assembly elbow 46, with the pivot joint 80 oriented on the horizontal axis F.

Accordingly, when the dual loading arm 10 is disconnected at the coupling swivel joints 40,42, and retracted from the tanker 36, the guide arm assembly 70 will continue to keep the arm 10 lined up with the terminal swivel assembly 32, and when the arm is again extended to the tanker 36 the outer ends of the outboard arm sections 24,26 will be properly oriented to these joints 40,42 for reconnection thereto with a minimum of effort.

The guide arm assembly 70 also can be used to carry hydraulic or other power lines between the tanker 36 and the buoy or tower 12, and the power supply and controls can be on the tanker. This eliminates the necessity of having to provide for these lines on the loading arm 10 itself, and can result in significantly reduced cost and improved safety.

As best shown in FIGS. 4 and 5, the coaxial riser swivel joint 22 and the trunnion swivel joints 18 and 12 are interconnected. through a plurality of pipe elbows 84,86 and 88 to form a swivel joint pipe elbow riser assembly 100. This assembly maintains a complete separation between fluid flow channel 82, which extends from the central portion 22a of the coaxial swivel 22 through elbow 84 and trunnion swivel 18 into inboard arm section 14, and fluid flow channel 90 which extends from the peripheral portion 22b of coaxial swivel 22 through elbows 86,88 and trunnion swivel 20 into the other inboard arm section 16. Thus, two different fluid products can be moved simultaneously through this swivel joint-pipe elbow assembly 100 without any chance of their intermixing, regardless of what position the loading arm sections happen to occupy. A similar arrangement can be employed at the terminal coupling assembly 32 so that the isolation of these separate fluid streams is maintained throughout the arm assembly 10 into the tanker manifold 34. Accordingly, two separate flow passages through the arm assembly 10 are provided and flow in each passage can move independently in either direction, as indicated by the arrows in FIG. 4.

Although the best mode contemplated for carrying out the present invention has been herein shown and described, it will be apparent that modification and variation may be made without departing from what is regarded to be the subject matter of the invention.

I claim:

1. A marine loading arm assembly for simultaneously transferring a plurality of fluid products in separate flow passages between an offshore facility and a floating marine vessel, comprising
   a. an upstanding fluid conducting riser assembly including a first coaxial pipe swivel joint means having a plurality of flow passages therethrough,
   b. a plurality of articulated rigid conduits defirming loading arms,
   c. means for pivotally connecting the respective inner ends of said loading arms to said first coaxial swivel joint means, whereby said loading arms and said first coaxial swivel joint means form a plurality of individual fluid flow passages,
   d. second coaxial pipe swivel joint means having a plurality of flow passages therethrough,
   e. means for pivotally interconnecting and detachably securing the respective outer ends of said loading arms with said second coaxial swivel joint means, said interconnecting means continuing said individual fluid flow passages from said loading arms to said second coaxial swivel joint means, said second swivel joint means providing primary support for said loading arms outwardly of said first swivel joint, and f. means for maintaining said loading arms and said second coaxial swivel joint means in a predetermined alignment relationship when said loading arms are disconnected from said second coaxial swivel joint means, said maintaining means comprising a guide arm assembly having a plurality of non fluid-conducting arm sections, means pivotally interconnecting said arm sections, and means pivotally connecting said assembly to said first and second coaxial swivel joint means, said pivotally interconnected guide arm sections being free of attachment to either of said loading arms between said first and second swivel joint means, whereby said loading arms and said second coaxial swivel joint means can be maneuvered without interference and as an assembly between at least two positions to provide a plurality of individual flow conduits for separate and simultaneous transfer of individual fluid products and wherein connection misalignment of said loading arms in a lateral plane as a result of relative movement between said joints in any direction when the loading arms are disconnected therefrom is prevented by said guide arm assembly supported between said joints.

2. A marine loading arm assembly according to claim 1, including means for mounting the first coaxial swivel joint means on an offshore fluid loading terminal, and means for connecting said first coaxial swivel joint means to a plurality of riser conduits.

3. A marine loading arm assembly according to claim 1, wherein the first coaxial swivel joint means and the articulated loading arms are interconnected by pipe swivel joint means that function as trunnion bearings for said loading arms.

4. A marine loading arm assembly according to claim 1, wherein each of the plurality of loading arms comprises at least two pivotally interconnected arm sections each of which establishes an articulated flow conduit between said first and second coaxial swivel joint means.

5. A marine loading arm assembly according to claim 1, wherein each of said loading arms is connected to said second coaxial swivel joint means by a plurality of pipe swivel joints oriented on mutually perpendicular axes.

* * * * *

UNITED STATES PATENT OFFICE
CERTIFICATE OF CORRECTION

Patent No. 4,099.542      Dated July 11, 1978

Inventor(s) H.M. GIBBONS

It is certified that error appears in the above-identified patent and that said Letters Patent are hereby corrected as shown below:

Column 4, line 51; change "pluraity" to --plurality--.
line 51; change "defirming" to --defining--.

Signed and Sealed this

Twenty-ninth Day of January 1980

[SEAL]

Attest:

SIDNEY A. DIAMOND

Attesting Officer      Commissioner of Patents and Trademarks